United States Patent
Wall et al.

(10) Patent No.: US 12,286,935 B2
(45) Date of Patent: Apr. 29, 2025

(54) METHODS AND SYSTEMS FOR CONTROLLING AN ENGINE SYSTEM OF A VEHICLE

(71) Applicant: ROLLS-ROYCE plc, London (GB)

(72) Inventors: Derek S. Wall, Bristol (GB); Asad Mustafa, Bristol (GB); Robert Johnson, Bristol (GB); Jonathan Wieland, Bristol (GB)

(73) Assignee: Rolls-Royce plc, London (GB)

( * ) Notice: Subject to any disclaimer, the term of this patent is extended or adjusted under 35 U.S.C. 154(b) by 91 days.

(21) Appl. No.: 18/176,777

(22) Filed: Mar. 1, 2023

(65) Prior Publication Data
US 2023/0296057 A1 Sep. 21, 2023

(30) Foreign Application Priority Data
Mar. 17, 2022 (GB) ...................... 2203716

(51) Int. Cl.
*F02C 9/00* (2006.01)
(52) U.S. Cl.
CPC .......... *F02C 9/00* (2013.01); *F05D 2220/323* (2013.01); *F05D 2270/051* (2013.01); *F05D 2270/706* (2013.01)
(58) Field of Classification Search
CPC ........ B64D 31/00; B64D 31/04; B64D 31/06; F02C 9/00; F02C 9/28; F02C 9/44; F05D 2270/44; F05D 2270/706
See application file for complete search history.

(56) References Cited

U.S. PATENT DOCUMENTS

| | | | |
|---|---|---|---|
| 4,258,545 A | 3/1981 | Slater | |
| 4,312,041 A | 1/1982 | DeJonge | |
| 5,315,819 A | 5/1994 | Page et al. | |
| 6,311,106 B1 | 10/2001 | Dupont | |
| 6,808,141 B2 * | 10/2004 | Bretscher | ............... F02D 29/02 |
| | | | 244/76 R |

(Continued)

FOREIGN PATENT DOCUMENTS

EP 3 712 074 A1 9/2020

OTHER PUBLICATIONS

Extended European Search Report, dated Jul. 12, 2023, pp. 1-7, issued in European Application No. 23157167.0, European Patent Office, Munich Germany.

(Continued)

*Primary Examiner* — Alain Chau
(74) *Attorney, Agent, or Firm* — Shumaker & Sieffert, P.A.

(57) ABSTRACT

Disclosed is a computer-implemented method for controlling an engine system of a vehicle comprising: determining an operating condition of the vehicle; determining one or more contextual conditions relevant to the vehicle; selecting, based upon both the determined operating condition and the determined one or more contextual conditions, a control profile for the engine system from a directory comprising a plurality of control profiles having different control characteristics; applying the selected control profile to a controller of the engine system; and controlling the engine system with the controller in accordance with the selected control profile. Also disclosed are an engine control system, a gas turbine engine, and an aircraft.

20 Claims, 4 Drawing Sheets

| 500 | | Contextual conditions | | |
|---|---|---|---|---|
| | | Turbulence | Near maintenance interval | Low fuel |
| Operational conditions | Take-off | P1 | D | D |
| | Cruise | D | P2 | P3 |
| | Combat | P4 | D | D |
| | Re-fuelling | P5 | P5 | P5 |

(56) References Cited

U.S. PATENT DOCUMENTS

| | | | | |
|---|---|---|---|---|
| 7,904,282 | B2* | 3/2011 | Goebel | F02C 9/00 60/773 |
| 8,655,508 | B2* | 2/2014 | Sweet | F02C 9/00 244/54 |
| 9,850,823 | B2* | 12/2017 | Miduturi | F02C 9/28 |
| 11,111,814 | B2* | 9/2021 | Jastrzembowski | F02C 9/00 |
| 11,428,171 | B2* | 8/2022 | Brown | F02C 9/28 |
| 2003/0052224 | A1* | 3/2003 | Bretscher | F02D 29/02 244/65 |
| 2003/0089113 | A1* | 5/2003 | Simunek | F02C 9/48 60/773 |
| 2008/0229754 | A1* | 9/2008 | Goebel | F02C 9/00 60/772 |
| 2009/0097959 | A1 | 4/2009 | Vos et al. | |
| 2012/0310448 | A1* | 12/2012 | Sweet | B64D 31/06 701/3 |
| 2013/0166169 | A1 | 6/2013 | McCollough | |
| 2015/0005990 | A1 | 1/2015 | Burns et al. | |
| 2015/0184611 | A1* | 7/2015 | Miduturi | F02C 9/28 123/672 |
| 2016/0237917 | A1 | 8/2016 | Marconi et al. | |
| 2018/0119628 | A1 | 5/2018 | Zeller et al. | |
| 2019/0032577 | A1 | 1/2019 | Cipolla et al. | |
| 2019/0186288 | A1* | 6/2019 | Jastrzembowski | F02C 9/00 |
| 2020/0392910 | A1 | 12/2020 | Whatley | |
| 2021/0172384 | A1* | 6/2021 | Brown | F02C 6/20 |
| 2021/0372295 | A1* | 12/2021 | Jastrzembowski | F02C 9/00 |
| 2022/0243664 | A1* | 8/2022 | Gao | F02C 7/36 |

OTHER PUBLICATIONS

Great Britain search report dated Sep. 16, 2022, issued in GB Patent Application No. 2203716.2.

* cited by examiner

| 500 | Contextual conditions | | |
|---|---|---|---|
| Operational conditions | Turbulence | Near maintenance interval | Low fuel |
| Take-off | P1 | D | D |
| Cruise | D | P2 | P3 |
| Combat | P4 | D | D |
| Re-fuelling | P5 | P5 | P5 |

*FIG. 5*

METHODS AND SYSTEMS FOR CONTROLLING AN ENGINE SYSTEM OF A VEHICLE

CROSS-REFERENCE TO RELATED APPLICATIONS

This specification is based upon and claims the benefit of priority from United Kingdom patent application number GB 2203716.2 filed on Mar. 17, 2022, the entire contents of which is incorporated herein by reference.

BACKGROUND

Technical Field

This disclosure concerns methods and systems for controlling an engine system of a vehicle.

Description of the Related Art

Existing control systems for engine systems of vehicles are typically developed and designed with fixed control characteristics which are acceptable for all conditions in which the vehicle may operate in a 'one size fits all' manner.

It will be understood that improvements in control of engine systems are desirable.

SUMMARY

According to a first aspect of the present disclosure, there is provided a computer-implemented method for controlling an engine system of a vehicle comprising: determining an operating condition of the vehicle; determining one or more contextual conditions relevant to the vehicle; selecting, based upon both the determined operating condition and the determined one or more contextual conditions, a control profile for the engine system from a directory comprising a plurality of control profiles having different control characteristics; applying the selected control profile to a controller of the engine system; and controlling the engine system with the controller in accordance with the selected control profile.

The operating condition of the vehicle may be a current mission phase or operational status of the vehicle. The operating condition generally relates to the current task or activity that the vehicle is performing. For example, in an aircraft, the operating conditions may include take-off, landing, cruise, combat, refuelling, taxiing, ascending, and descending. Operating conditions may comprise more than one operational status where the relevant conditions are not mutually exclusive. For example, the operating condition could comprise both take-off and combat, when an aircraft is scrambled for an urgent combat mission.

Operating conditions may comprise flight phases. Flight phases may include one or more of maintenance, start-up, taxi, take-off, climb, cruise, approach, descent, landing, and go-around.

The contextual conditions may be other factors which are not related to the current operational status of the vehicle. These contextual factors are not specifically indicative of the current task or operation that the vehicle is performing and are instead relevant factors of the operational context in which the vehicle is performing its operations. These factors may be internal to the vehicle, such as the cargo loading, the distance the vehicle has travelled on the current mission, or the time to the next service, or may be external to the vehicle, such as the weather, wind speed or direction, or the current distance from a vehicle base.

Contextual conditions may comprise one or more of: climatic conditions, flight use case, task status and/or characteristic, military application, air traffic management status, environmental context, economic context, and power and vehicle system health status.

Climatic conditions may comprise one or more of icing, relative humidity, delta from standard atmosphere temperature. Flight use case may comprise one or more of passenger, cargo, ferry flight. Task status and/or characteristic may comprise more detail regarding a specific tasking such as aerial survey, on-transit, on/off task. Military application may include one or more of peace-time, in-conflict, threat level. Air traffic management status may comprise civil airspace category. Environmental context may comprise predicted and/or measured atmospheric pollutants level. Economic context may comprise one or more of jet fuel price, maintenance base cost, and maintenance base availability. Power and vehicle system health status may comprise one or more of healthy, non-critical fault, hazardous fault, and incipient failure or abrupt failure.

A control profile for the engine system comprises control settings for achieving certain control behaviours. The controller may control functions of the engine system, such as thrust, in response to control inputs by a human operator of the vehicle or from an automated system, such as an autopilot, and the controller may control the engine systems to achieve the required control outcome based upon the control inputs. Each control profile comprises different control characteristics. For example, one control profile may comprise control variables that prioritise reduction in lag, whereas another profile may prioritise overshoot avoidance or minimising steady state error. The directory comprises a plurality of different control profiles which can be selected and applied to the controller to achieve different control behaviour.

A control profile may further include stability margins (i.e., control features which may affect the engine control response characteristic but instead guarantee safe operation). Accordingly, each control profile may comprise a different control characteristic operable to vary the level of control system stability margins depending on the operating and/or contextual conditions.

The functions, components, or sub-systems of the engine system whose control characteristics may be altered by the control profile may include (but are not limited to) thrust, operability via a single effector or set of effectors (such as fuel pumping), gas path variable geometry or geometries, variable pitch fan(s) or propeller(s), variable nozzle orifice (s), electrical shaft power offtake (e.g. via generator load), and active thermal subsystem (e.g. controlling heat sinks).

The vehicle may be an aircraft. The engine system may be an aircraft engine system. The engine system may comprise a gas turbine engine.

Determining the operating condition of the aircraft may comprise: receiving an operating condition signal, for example from a human operator of the aircraft indicative of the operating condition or from another system of the aircraft such as autopilot or sensor systems; and/or automatically determining the operating condition of the aircraft based upon one or more of the airspeed, altitude, manoeuvres, location, elapsed flight time, rate of ascent or descent, and/or orientation of the aircraft.

Determining the one or more contextual conditions relevant to the aircraft may comprise: receiving a contextual condition signal, for example from a human operator of the aircraft or from another system of the aircraft such as autopilot or sensor systems, indicative of one or more contextual conditions; and/or automatically determining the one or more contextual conditions based upon one or more of an elapsed flight time, flight plan, ambient weather, ambient temperature, ambient wind speed, ambient wind direction, service interval, elapsed time since last service, remaining fuel level, component health, distance from intended landing location, and air traffic control alerts.

Selecting a control profile based upon the determined operating condition and one or more contextual conditions may comprise: determining required control characteristics based upon the determined operating condition and one or more contextual conditions; and selecting from the directory, a control profile that is configured to provide required control characteristics.

The directory of control profiles may comprise: a default profile having a plurality of default control characteristics; and a plurality of context profiles having at least one control characteristic differing from the default control characteristics.

A default profile may be provided with default control variable values and default control characteristics. The default profile may be selected and applied where it is determined, based upon the determined operating condition and one or more contextual conditions, that no special control characteristics are required. If a suitable control profile for the determined operating condition and one or more contextual conditions is not able to be determined, then the default control profile may be selected and applied.

The context profiles may provide control characteristics which differ from the default profile control characteristics in at least one way. For example, one control profile may comprise control variables that prioritise reduction in lag, whereas another profile may prioritise overshoot avoidance or minimising steady state error. The directory comprises a plurality of different control profiles which can be selected and applied to the controller to achieve different control behaviour.

The control profiles may be named or classified in accordance with their common use scenarios. For example, there may be a 'combat' context profile suited to high responsiveness and reduced precision and efficiency, and a 'landing' context profile which promotes fine adjustment and minimising steady state error. There may be further context profiles which are sub-classifications of wider operational classes, such as 'high altitude combat' or 'low fuel landing', which provide further tailored control characteristics.

Controlling the vehicle engine system may comprise a control regime having one or more control variables. Each control profile may comprise specific values for the one or more control variables. The control profiles may contain control variables or parameters, for example PID terms or constants for PID control, that provide certain control characteristics.

The control regime may be proportional, integral, and derivative (PID) control, linear-quadratic regulator (LQR) control, linear-quadratic-Gaussian (LQG) control, and/or model predictive control (MPC). It should be understood that the principles of the present disclosure could be applied to any parametrised controller, including but not limited to: classical controllers, P, PI, PID, gain-scheduling control designs, loop-shaping control designs, Linear Quadratic Regulator (LQR), Linear Quadratic Gaussian (LQG), Model Predictive Control, optimal controllers, robust control (H infinity, pole placement), state-space, adaptive control, hierarchical control, Sliding Mode Control, and Model-Based Control.

The control regime may comprise proportional, integral, and derivative control and the control variables may be the proportional, integral, and derivative control constants.

The method may further comprise: re-determining the operating condition of the vehicle; re-determining the one or more contextual conditions relevant to the vehicle; selecting, based upon both the re-determined operating condition and the re-determined one or more contextual conditions, an updated control profile for the vehicle engine system from a directory comprising a plurality of control profiles having different control characteristics; and, if the updated control profile is different from the current control profile, applying the updated control profile to the controller of the vehicle engine system; and controlling the vehicle engine system with the controller in accordance with the updated control profile.

In other words, the method may comprise periodically or continuously determining the operating condition and the contextual conditions and determining the best suited control profile for the current conditions. The operating and contextual conditions will often vary throughout a mission or journey so various different control profiles may be applied for different sections of the journey to best suit the contemporaneous conditions.

The method may further comprise: receiving at a control system of the vehicle mission prediction information comprising an expected operating conditions of the vehicle during an upcoming mission and a plurality of expected contextual conditions during an upcoming mission; automatically accessing a library of control profiles, creating a shortlist of control profiles from the library based upon the expected operating conditions and the expected contextual conditions; and populating the directory of control profiles with the shortlisted plurality of control profiles.

The library may comprise more control profiles than are needed for every mission or journey. It may be beneficial to provide a reduced shortlist of control profiles for possible selection to reduce processing requirements or improve processing speed. The control system may consider a mission plan and predict a shortlist of the most likely control profiles which may be needed for a mission based upon the mission plan, and populate the vehicle control directory with the shortlisted profiles.

The method may further comprise: displaying the shortlist of control profiles to a human operator of the vehicle, and permitting the human operator to approve or edit the shortlist of control profiles.

The method may further comprise: recording control data while controlling the vehicle engine system with the controller in accordance with the selected control profile; assessing the control data to determine whether the selected control profile provides the required control characteristics for the relevant operating condition and one or more contextual conditions; and, if it is determined that the required control characteristics are not provided or are not adequately provided: determining an alternative control profile for the relevant operating condition and one or more contextual conditions or determining alterations to the selected control profile to provide the required control characteristics.

If the assessing step is performed after a mission, then the method may further comprise updating the selection step such that the alternative control profile is selected in the relevant operating condition and one or more contextual conditions in future missions and/or altering the selected control profile for future missions. In some examples, the assessing step may be performed in real time during an ongoing mission, and therefore the alternative control profile may be immediately selected or selected the next time that the relevant operating condition and one or more contextual conditions are present, and/or the alterations to the selected control profile may be made in during the ongoing mission.

The control may be of the engine propulsion system or of a thrust of the engine system. The control may be of a thermal management system of the engine system, or of a fuel management system of the engine system.

According to a second aspect of the present disclosure, there is provided an engine control system for a vehicle comprising: a controller configured to control an engine system of a vehicle, wherein the controller is configured to: determine an operating condition of the vehicle and determine one or more contextual conditions relevant to the vehicle; select, based upon the determined operating condition and one or more contextual conditions, a control profile from a directory comprising a plurality of control profiles having different control characteristics; apply the selected control profile; and control the engine system in accordance with the selected control profile.

In some examples according to the first and second aspects, the determining of the operation and contextual conditions, the selecting and applying of the control profile may be performed at a remote location whilst the vehicle is in transit (or, in the case of an aircraft, while in-flight or operational). For example, the vehicle may transmit sensor and signal data to a remote system (e.g. via satellite or other wireless communications), the remote system may perform the determining, and selecting processes, and transmit the selected control profile to the vehicle (e.g. via satellite or other wireless communications).

The engine control system may be configured to implement the method according to the first aspect.

The vehicle may be an aircraft, and the engine system may be an aircraft engine system.

According to a third aspect of the present disclosure, there is provided a gas turbine engine for an aircraft, the gas turbine engine comprising the aircraft engine control system of the second aspect.

According to a fourth aspect of the present disclosure, there is provided an aircraft comprising a gas turbine engine according to the third aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

According to an aspect of the present disclosure, there is provided an aircraft comprising a cabin blower system or a gas turbine engine as described and/or claimed herein.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

DESCRIPTION OF THE DRAWINGS

Embodiments will now be described by way of example only with reference to the accompanying drawings, which are purely schematic and not to scale, and in which:

FIG. 5 is a schematic representation of the method of controlling an engine system of a vehicle in the form of a control system matrix.

DETAILED DESCRIPTION

FIG. 1

Figure 1:
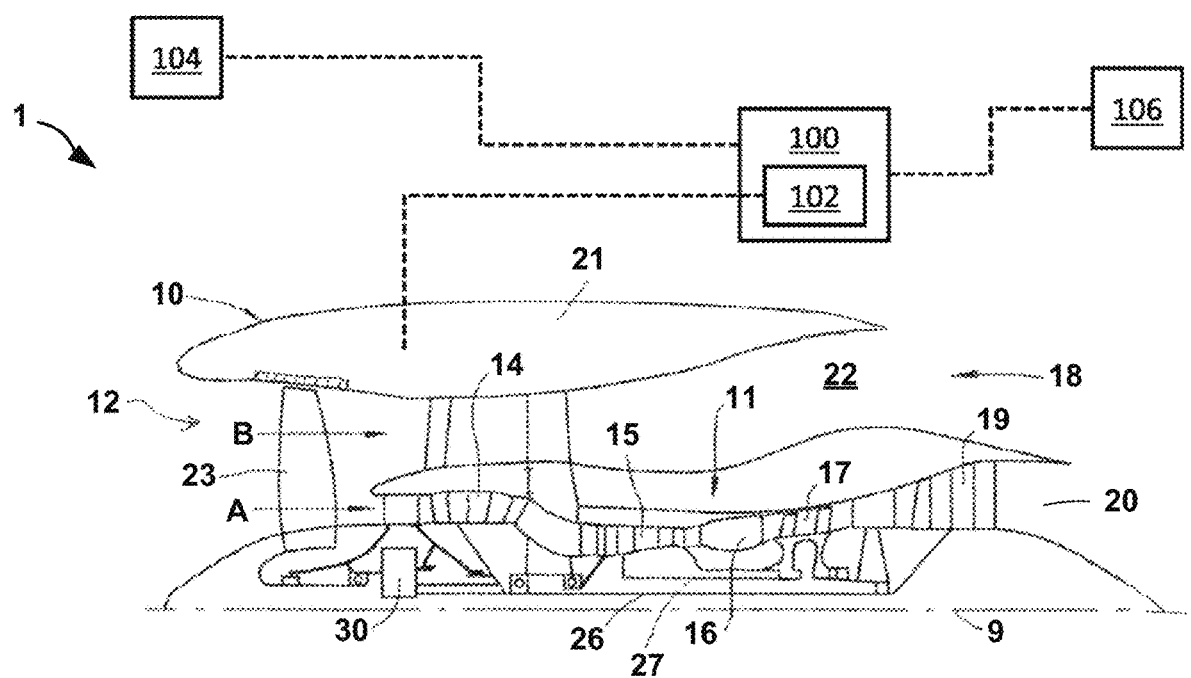
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low-pressure compressor 14, a high-pressure compressor 15, combustion equipment 16, a high-pressure turbine 17, a low-pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low-pressure turbine 19 via a shaft 26 and an epicyclic gearbox 30.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high-pressure and low-pressure turbines 17, 19 before being exhausted through the nozzle 20 to provide some propulsive thrust. The high-pressure turbine 17 drives the high-pressure compressor 15 by a suitable interconnecting shaft 27. The fan 23 generally provides the majority of the propulsive thrust. The epicyclic gearbox 30 is a reduction gearbox.

FIG. 1 also shows a control system 100 for the engine 10. The control system 100 comprises a controller 102 configured to control the various functions of the engine 10 and, more generally, a wider engine system 1 comprising the engine 10. The control system 100 is in communication with a control input system 104 through which a human operator of the aircraft can provide control inputs for the control system 100. Also in communication with the control system 100 are various sensors and systems, which will be referred to herein as the condition and context system 106. The condition and context system comprises various sensors and systems which provide the control system 100 with information and data regarding the operating condition of the aircraft and regarding contextual conditions relevant to the aircraft.

It should be understood that, in some examples, some or all of the control system such as the control input system 104 or the condition and context system 106 may be provided at a remote location in communication with the control system 100. For example, certain parts of the control methods described herein may be performed at a remote location whilst the vehicle is in transit (or, in the case of an aircraft, while in-flight or operational). For example, the vehicle may transmit sensor and signal data to a remote system (e.g. via satellite or other wireless communications), the remote system may perform the various determining, and selecting processes, and transmit data, such as the selected control profile, to the vehicle (e.g. via satellite or other wireless communications).

FIG. 2

Figure 2:
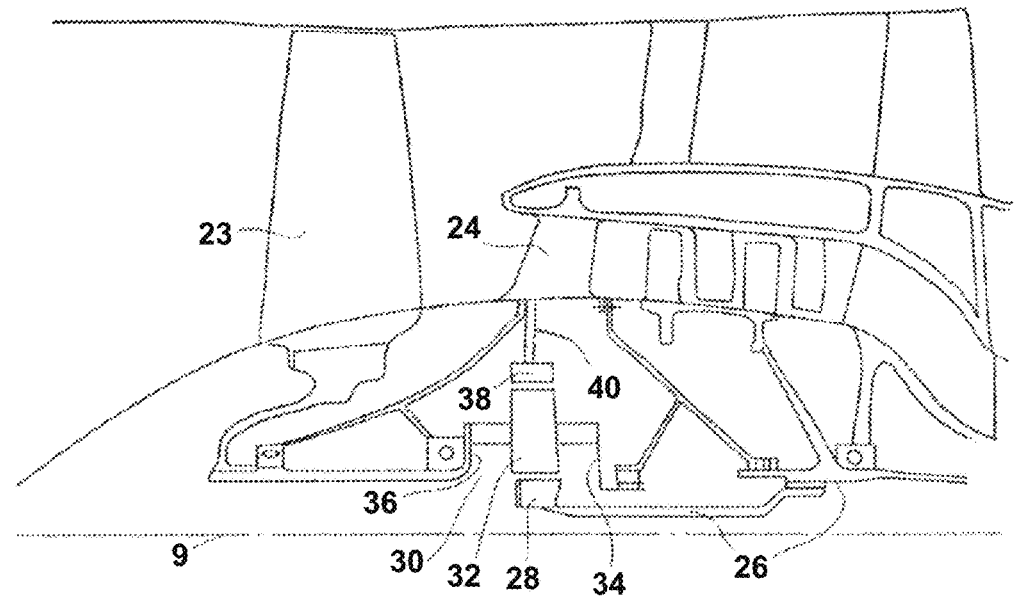
FIG. 2 is a close-up sectional side view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low-pressure turbine" and "low-pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low-pressure turbine" and "low-pressure compressor" referred to herein may alternatively be known as the "intermediate pressure turbine" and "intermediate pressure compressor". Where such alternative nomenclature is used, the fan 23 may be referred to as a first, or lowest pressure, compression stage.

FIG. 3

Figure 3:
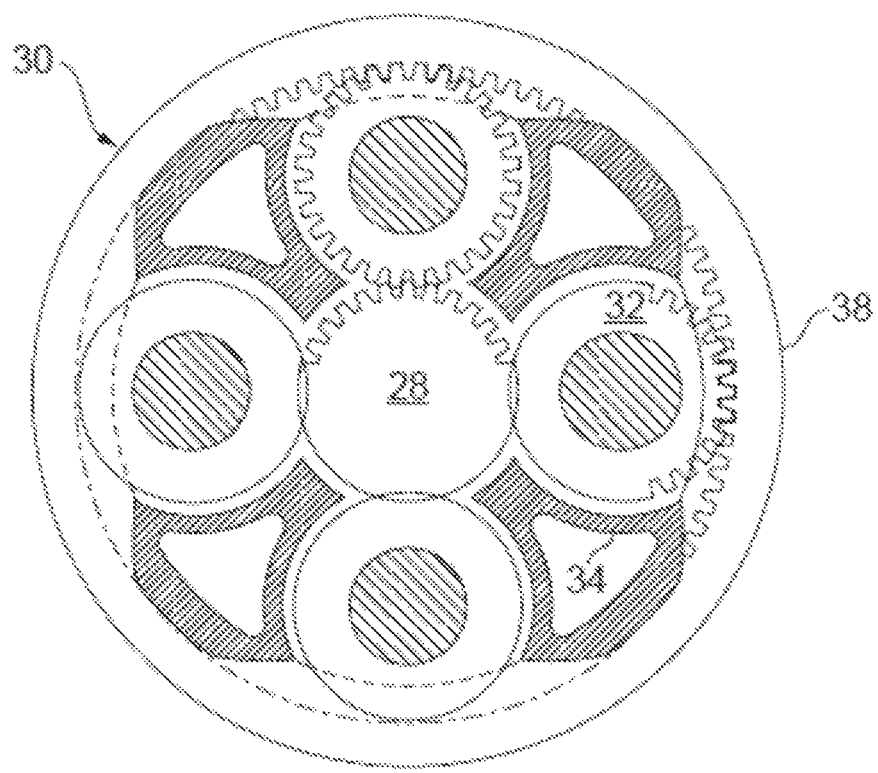
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the present disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations. Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

FIG. 4

Figure 4:
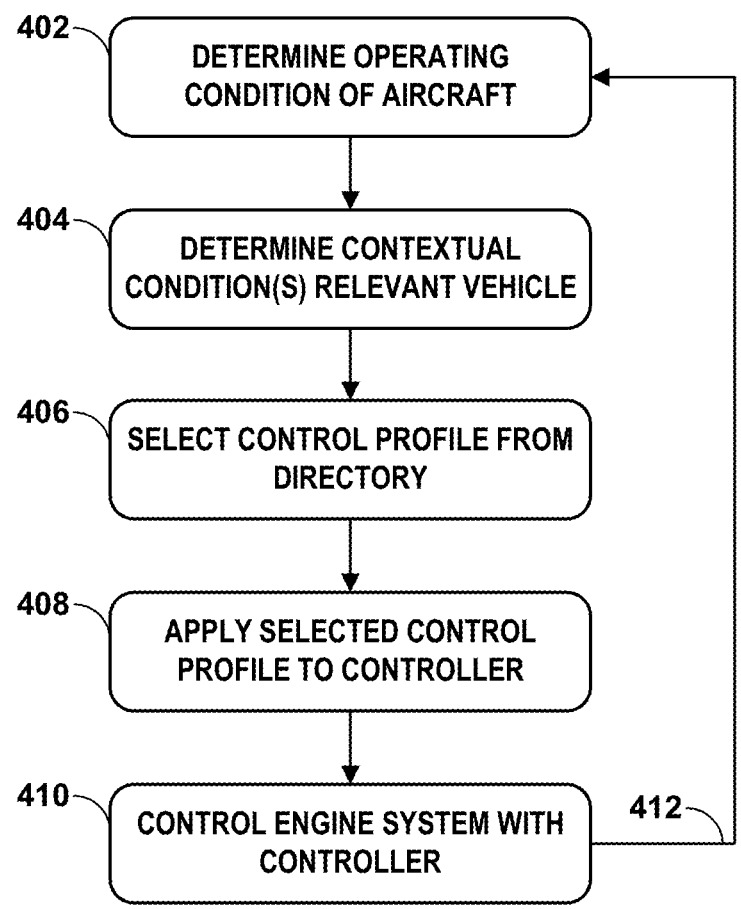
FIG. 4 is a schematic representation of a method of controlling an engine system of a vehicle.

An exemplary computer-implemented method 400 of controlling an engine system of a vehicle is shown in FIG. 4. In this example, the vehicle is an aircraft and the engine system is a gas turbine engine of the aircraft, such as gas turbine engine 10 discussed above.

The control method comprises:

402 determining an operating condition of the vehicle;

404 determining one or more contextual conditions relevant to the vehicle; 406 selecting, based upon both the determined operating condition and the determined one or more contextual conditions, a control profile for the engine system from a directory comprising a plurality of control profiles having different control characteristics;

408 applying the selected control profile to a controller of the engine system; and 410 controlling the engine system with the controller in accordance with the selected control profile.

The control method 400 should generally be understood as a control method which takes into account the operating conditions and context of the aircraft and implements a control regime which is tailored to the particular demands on the aircraft. In former known control systems, the control characteristics are generally fixed such that the control regime is "one-size-fits-all" and provides control characteristics which are generally acceptable in most conditions but which are also not optimal for most conditions.

The control method 400 will be described in more detail below.

Referring also to FIG. 1, the engine system 1 is controlled by a control system 100 comprising a controller 102. The control system 100 receives information from the control input system 104 and from the condition and context system 106.

Referring back to the method 400, determining the operating condition of the aircraft 402 is performed by the control system 100. In some examples, the control system 100 may receive an operating condition signal from the control input system 104 (i.e. from the human operator of the aircraft) or from the condition and context system 106, that is indicative of the operating condition. In other examples, the control system 100 may receive information and data regarding the operation of the aircraft from the condition and context system 106, and automatically determine the operating condition based upon the received information and data. The information and data provided by the condition and context system 106 may include information and data relating to one or more of the airspeed, altitude, manoeuvres, location, elapsed flight time, rate of ascent or descent, and/or orientation of the aircraft. In some examples, determining the operating condition may comprise both receiving an operating condition signal and automatically determining the operating condition based upon the received information and data. For example, the operator may indicate, via the control input system 104 that the aircraft condition is, e.g., in-flight refuelling and the control system 100 may, based upon the received information and data from system 106, further determine that the refuelling is being conducted at, e.g., high altitude and high speed.

More generally, the operating condition of the aircraft is a current mission phase or operational status. It should be understood that the operating condition generally relates to the current task or activity that the aircraft is performing. For example, the operating conditions for an aircraft may include take-off, landing, cruise, combat, refuelling, taxiing, ascending, and descending. Operating conditions may comprise more than one operational status where the relevant conditions are not mutually exclusive. For example, the operating condition could comprise both take-off and combat, when an aircraft is scrambled for an urgent combat mission.

Turning now to determining the contextual conditions relevant to the aircraft 104, this is likewise performed by the control system 100. In some examples, the control system 100 may receive an operating condition signal from the control input system 104 (i.e. from the human operator of the aircraft) or from the condition and context system 106, that is indicative of one or more contextual conditions. In other examples, the control system 100 may receive information and data regarding the contextual conditions relevant to the aircraft from the condition and context system 106, and automatically determine the contextual conditions based upon the received information and data. The information and data provided by the condition and context system 106 may include information and data relating to one or more of an elapsed flight time, flight plan, ambient weather, ambient temperature, ambient wind speed, ambient wind direction, service interval, elapsed time since last service, remaining fuel level, component health, distance from intended landing location, and air traffic control alerts. In some examples, determining the contextual conditions may comprise both receiving a contextual condition signal and automatically determining the contextual conditions based upon the received information and data. For example, the operator may indicate, via the control input system 104 that the aircraft is currently, e.g., flying in low visibility and the control system 100 may, based upon the received information and data, further determine that the aircraft is also, e.g. low on fuel and flying into a headwind.

More generally, contextual conditions should be understood as contextual factors which are not directly related to the current operational status of the vehicle. These contextual factors are not specifically indicative of the current task or operation that the vehicle is performing and are instead important indicators of the operational context in which the vehicle is performing is performing its operations. These factors can be internal to the vehicle, such as the cargo loading, the distance the vehicle has travelled on the current mission, or the time to the next service, or may be external to the vehicle, such as the weather, wind speed or direction, or the current distance from a vehicle base.

Next at block 406, the control system 400 selects, based upon both the determined operating condition and the determined contextual conditions, a control profile for the engine system 1 from a directory comprising a plurality of control profiles having different control characteristics.

The functions described in blocks 402, 404, and 406 may be performed remotely to the aircraft. For example, the aircraft may transmit the relevant data to a remote computing system (e.g. via satellite or other wireless communication), and the remote computing system may determine the conditions and select a control profile, and transmit the control profile back to the aircraft to be applied to the control system 100.

Each control profile for the engine system comprises control settings which are configured to achieve certain control behaviours. The controller 102 is configured to control functions of the engine system, such as thrust, in response to control inputs by a human operator of the vehicle or from an automated system, such as an autopilot, such that the engine systems achieve the required control outcome based upon the control inputs. The functions, components, or sub-systems of the engine system whose control characteristics may be altered by the control profile may include (but are not limited to) thrust, operability via a single effector or set of effectors (such as fuel pumping), gas path variable geometry or geometries, variable pitch fan(s) or propeller(s), variable nozzle orifice(s), electrical shaft power offtake (e.g. via generator load), and active thermal subsystem (e.g. controlling heat sinks).

Each control profile comprises different control characteristics. For example, one control profile may comprise control variables that, e.g., prioritise reduction in lag or rise time, whereas another profile may, e.g., prioritise overshoot avoidance or minimising steady state error. It should be understood that there are near infinite possibilities for different control profiles based upon the required control characteristics, so a definitive list of control profiles is not provided. However, based upon the principles of the present disclosure, it should be understood that a range of control profiles can be developed which are tuned to the different operational and contextual conditions in which any given vehicle may be operating.

The control profiles for the controller 102 are contained within a directory in the control system 100. The directory contains a plurality of different control profiles which can be selected and applied to the controller 102 to achieve different control behaviour from the controller 102. In some examples, the directory of control profiles may be stored remotely and transmitted to the aircraft (e.g. by satellite or other wireless communications).

In selecting a control profile, the control system 100 may determine one or more required control characteristics based upon the determined operating condition and one or more contextual conditions and then selecting from the directory a control profile that is configured to provide required control characteristics. For example, from the determining at blocks 402 and 404, the control system 100 may determine that the aircraft is, e.g., currently cruising at high altitude with a tailwind and with low fuel and, therefore, that fine adjustment and fast response times are not required control characteristics, whereas minimising steady-state error and improving engine efficiency with a gradual response to throttle input are more important. Consequently, the control system 100 may select a control profile which features these latter characteristics.

The directory of control profiles may comprise a default profile having a plurality of default control characteristics and a plurality of context profiles which each have at least one control characteristic differing from the default control characteristics. The default profile may be provided with default control variable values and default control characteristics suitable for the aircraft, analogous to the "one-size-fits-all" control regimes of the prior art mentioned above. The default profile may be selected and applied where it is determined, based upon the determined operating condition and one or more contextual conditions, that no special control characteristics are required. If a suitable control profile for the determined operating condition and one or more contextual conditions is not able to be determined, then the default control profile may be selected and applied.

It is possible that, in some examples, the determined combination of operational and contextual conditions may be particularly rare or unlikely, such that the directory does not contain an ideal control profile for the determined conditions. In this case, the control system may select the control profile having the closest possible control characteristics or may select the default control profile. Where no ideal control profile is provided in the directory for certain conditions, the control system 100 may record this information such that a control engineer can later develop a control profile better suited to the conditions experienced.

In some examples, where the directory does not contain an ideal control profile for the determined conditions or the conditions are ambiguous, the control system 100 may combine features of one or more existing control profiles (e.g. via interpolation) to create a new bespoke control profile, or provide a control profile which straddles two defined combinations.

The context profiles may provide control characteristics which differ from the default profile control characteristics in at least one way. For example, one control profile may comprise control variables that prioritise reduction in lag, whereas another profile may prioritise overshoot avoidance or minimising steady state error. The directory comprises a plurality of different control profiles which can be selected and applied to the controller to achieve different control behaviour.

The control profiles may be named or classified in accordance with their common use scenarios. For example, there may be a 'combat' context profile suited to high responsiveness and reduced precision and efficiency, and a 'landing' context profile which promotes fine adjustment and minimising steady state error. There may be further context profiles which are sub-classifications of wider operational classes, such as 'high altitude combat' or 'low fuel landing', which provide further tailored control characteristics for specific combinations of conditions which may occur.

The control regime may be proportional, integral, and derivative (PID) control, linear-quadratic regulator (LQR) control, linear-quadratic-Gaussian (LQG) control, and/or model predictive control (MPC). The control profiles may contain control variables, for example PID terms or constants for PID control, that provide certain control characteristics. It should be understood that there are many control regimes which can be used for controlling engine systems and also that future control regimes may differ from those currently available, and so a definitive list of control regimes is not provided here. However, equipped with the principles of the present disclosure, for any give control regime, appropriate control profiles having appropriate control characteristics can be developed which are tuned to the different operational and contextual conditions in which any given vehicle may be operating. It should be understood that the principles of the present disclosure could be applied to any parametrised controller, including but not limited to: classical controllers, P, PI, PID, gain-scheduling control designs, Linear Quadratic Regulator (LQR), Linear Quadratic Gaussian (LQG), Model Predictive Control, optimal controllers, robust control (H infinity, pole placement), state-space, adaptive control, hierarchical control, Sliding Mode Control, and Model-Based Control.

The description above describes how a suitable control profile can be selected and implemented based upon a determination of the current conditions. It should be understood that the operating condition and the contextual conditions will continuously change during flight and, therefore, that the most appropriate control profile will likewise change during the course of a flight. Therefore, the control method also comprises re-determining the operating condition of the vehicle, re-determining the one or more contextual conditions relevant to the vehicle, selecting, based upon both the re-determined operating condition and the re-determined one or more contextual conditions, an updated control profile for the vehicle engine system from a directory comprising a plurality of control profiles having different control characteristics, and, if the updated control profile is different from the current control profile, applying the updated control profile to the controller of the vehicle engine system.

This 're-selection' process is indicated by the arrow 412 in FIG. 4. While controlling the engine system 1 according to any given control profile, the control system 100 may return to block 402 and perform the method 400 again to assess whether the conditions have changed and, therefore, whether the control profile should be changed. This process can be performed substantially continuously during flight or can be performed at pre-determined time intervals.

FIG. 5

A schematic representation of the principles of method 400 is shown in FIG. 5 in the form of a control system matrix 500.

The matrix 500 comprises a plurality of columns, each column relating to a particular contextual condition, and a plurality of rows, each row relating to a particular operational condition. In this exemplary matrix 500, for simplicity, three contextual conditions and four operational conditions are shown. It should be understood that, in other examples, more conditions (both operational and contextual) may be accounted for.

At the intersection of each column and row, the matrix 500 indicates one of six control profiles which are provided in the control profile directory as discussed above. The control profiles utilised in this non-exhaustive example are denoted as D and P1-P5. D is the default profile, and each of P1-P5 is a different control profile having different control characteristics, as discussed above.

Matrix 500 shows visually the selection process which may be undertaken by the control system 100 in method 400, block 406. For example, the control system may determine (at block 402) that the current operational condition is cruise, and determine (at block 404) that the current contextual condition is low fuel. Therefore, the control system 100 would, in this example, select control profile P3 and apply it to the controller 102 to control the engine system 1. By way of example, control profile P3 may exhibits control that forgoes sensitivity and fast throttle response times in favour of minimising steady-state error and improving engine efficiency with a gradual response to throttle input.

As another example for matrix 500, the control system may determine (at block 402) that the current operational condition is combat, and determine (at block 404) that the current contextual condition is turbulence. Therefore, the control system 100 would, in this example, select control profile P4 and apply it to the controller 102 to control the engine system 1. By way of example, control profile P4 might exhibit control that favours throttle aggression and sensitivity, while having less focus on control characteristics which might improve efficiency.

In some examples, it may be that one condition (either operational or contextual) overrides all other conditions in determining the control profile to be used. In the example of matrix 500, the refuelling operational condition is such a condition. Regardless of the contextual condition, the control profile P5 is always selected when refuelling is the operational condition. P5 might exhibit control which favours precision and reduced sensitivity to avoid sudden throttle changes which might be counterproductive or dangerous during in-flight refuelling.

In other combination examples, such as take-off near maintenance interval, cruise in turbulence, combat at low fuel, it may be determined that no special control characteristics are required and, therefore, that the default control profile D should be applied.

It will be appreciated that come conditions are not mutually exclusive, particularly the contextual conditions. In some examples where more than one contextual condition is determined, the control system 100 may determine a highest-priority contextual condition and select a control profile best suited to that condition. In other examples where more than one contextual condition is determined, the control system 100 may select a balanced control profile which provides optimised control for the current combination of conditions. Where the contextual conditions present require conflicting control characteristics, then the control system 100 may automatically select a most-suitable control profile, or it may request instruction from the human operator via control input system 104 regarding which control profile to select.

Although the selection process is displayed as a table in FIG. 5, it should be understood that the selection of the control profile by the control system 100 may not be a simple look-up table. The control system 100 may make real-time assessment of the required control characteristics for the current conditions and select an appropriate control profile.

The control method of the present disclosure may include pre-mission portion involving the population of the directory of control profiles for an upcoming mission. In some examples, the library of control profiles may comprise many more control profiles than are needed for every mission or journey and therefore, it may be beneficial to provide a reduced shortlist of control profiles for possible selection during a mission to reduce processing requirements or improve processing speed. The control system 100 may consider a mission plan and predict a shortlist of the most likely control profiles which may be needed for a mission based upon the mission plan, and populate the vehicle control directory with the shortlisted profiles.

In some examples, this process may further involve the human operator. In some examples, after compiling the shortlist of control profiles, the control system 100 may display the shortlist to a human operator of the vehicle for their review. The human operator may then approve or edit the shortlist of control profiles before the directory for the mission is populated. This may be beneficial where the flight plan provided to the control system 100 has been subject to last minute changes or where the human operator may have some information regarding the upcoming mission, which is not available to the control system 100, and that may require control profiles which are unforeseen by the control system 100.

It will be appreciated that, in some cases, it may be that conditions occur in which no suitable control profile is available in the directory or that the selected control profile does not in fact provide the required control characteristics.

Therefore, in some examples, the control system 100 may record control data while controlling the vehicle engine system with the controller in accordance with the selected control profile and assess the control data to determine whether the selected control profile provides the required control characteristics for the relevant operating condition and one or more contextual conditions. If the required control characteristics are provided, then no further action may be taken. However, if it is determined that the required control characteristics are or were not provided or are not adequately provided (e.g, the control was sub-optimal), then the control system may determine or select an alternative control profile to be applied for the relevant operating condition and one or more contextual conditions now and in future. In other examples, the control system 100 may determine alterations to the selected control profile to provide the required control characteristics, such as updated control variables which are better suited to providing the required control characteristics.

If this assessment of the control performance is performed after a mission, then the method may include updating the selection step such that the alternative control profile is selected in the relevant operating condition and one or more contextual conditions in future missions, or it may include altering the selected control profile for future missions. In some examples, the assessing step may be performed in real time during an ongoing mission, and therefore the alternative control profile may be immediately selected or selected the next time that the relevant operating condition and one or more contextual conditions are present, and/or the alterations to the selected control profile may be made in during the ongoing mission.

The control systems and methods described herein may provide various benefits over known control systems. The presently disclosed systems and methods provide that, with knowledge of the current or planned conditions and contextual environment of a vehicle, the control characteristics can be tailored in order to achieve the required control behaviour. Tailoring of the control characteristics in the manner disclosed allows modification of the controller behaviour, such as control sensitivity, response trajectory, and allowed thresholds/characteristics for response overshoot and lag. This may include electrical and thermal machinery (effectors), as well as hydraulic actuators. For example, the present systems and methods may enable modification to actuator control behaviour in order to effect changes to propulsion control or reducing thermal system control sensitivity in order to maintain a more stable temperature. The present disclosure provides real-time adjustment of controller characteristics controller during operation to provide control that suited to the current conditions.

Although the specific example herein relates to an aircraft, it should be understood that the principles of the present disclosure may be applied to other vehicles.

It should be further understood that the principles of the disclosed control systems and control methods may be applied to other systems than the engine system of a vehicle. For example, the methods and systems described herein could be applied to the flight control surfaces of an aircraft, or the steering system of automobiles or aquatic vehicles such as ships or submarines. Generally, it should be understood that the process of determining the operational and contextual conditions in which a vehicle is operating, and selecting a bespoke control profile which provides control characteristics which are tailored to the conditions could be applied to many vehicle subsystems in many different types of vehicle to provide improved control and vehicle function.

It will be understood that the present disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein. The scope of protection is defined in the appended claims.

What is claimed:

1. A computer-implemented method for controlling an engine system of a vehicle comprising:
   determining an operating condition of the vehicle;
   determining one or more contextual conditions relevant to the vehicle;
   receiving, at a control system of the vehicle, mission prediction information comprising an expected operating conditions of the vehicle during an upcoming mission and a plurality of expected contextual conditions during the upcoming mission;
   automatically accessing a library of control profiles, creating a shortlist of control profiles from the library based upon the expected operating conditions and the expected contextual conditions;
   populating a directory of control profiles with the shortlisted plurality of control profiles;
   selecting, based upon both the determined operating condition and the determined one or more contextual conditions, a control profile for the engine system from the directory;
   applying the selected control profile to a controller of the engine system; and
   controlling the engine system with the controller in accordance with the selected control profile.

2. The computer-implemented method for controlling an engine system according to claim 1, wherein the vehicle is an aircraft and wherein the engine system is an aircraft engine system.

3. The computer-implemented method for controlling an aircraft engine system according to claim 2, wherein determining the operating condition of the aircraft comprises:
receiving an operating condition signal indicative of the operating condition; and/or
automatically determining the operating condition of the aircraft based upon one or more of the airspeed, altitude, maneuvers, location, elapsed flight time, rate of ascent or descent, and/or orientation of the aircraft.

4. The computer-implemented method for controlling an aircraft engine system according to claim 2, wherein determining the one or more contextual conditions relevant to the aircraft comprises:
receiving a contextual condition signal indicative of one or more contextual conditions; and/or
automatically determining the one or more contextual conditions based upon one or more of an elapsed flight time, flight plan, ambient weather, ambient temperature, ambient wind speed, ambient wind direction, service interval, elapsed time since last service, remaining fuel level, component health, distance from intended landing location, and air traffic control alerts.

5. The computer-implemented method for controlling an engine system according to claim 1, wherein selecting a control profile based upon the determined operating condition and one or more contextual conditions comprises:
determining required control characteristics based upon the determined operating condition and one or more contextual conditions, and
selecting from the directory, a control profile that is configured to provide required control characteristics.

6. The computer-implemented method for controlling an engine system according to claim 1, wherein the directory of control profiles comprises:
a default profile having a plurality of default control characteristics, and
a plurality of context profiles having at least one control characteristic differing from the default control characteristics.

7. The computer-implemented method for controlling an engine system according to claim 1, wherein controlling the vehicle engine system comprises a control regime having one or more control variables, and wherein each control profile comprises specific values for the one or more control variables.

8. The computer-implemented method for controlling an engine system according to claim 7, wherein the control regime comprises proportional, integral, and derivative control and wherein the control variables are the proportional, integral, and derivative control constants.

9. The computer-implemented method for controlling an engine system according to claim 1, further comprising:
re-determining the operating condition of the vehicle;
re-determining the one or more contextual conditions relevant to the vehicle;
selecting, based upon both the re-determined operating condition and the re-determined one or more contextual conditions, an updated control profile for the vehicle engine system from a directory comprising a plurality of control profiles having different control characteristics; and
if the updated control profile is different from the current control profile,
applying the updated control profile to the controller of the vehicle engine system; and
controlling the vehicle engine system with the controller in accordance with the updated control profile.

10. The computer-implemented method for controlling an engine system according to claim 1, further comprising:
displaying the shortlist of control profiles to a human operator of the vehicle, and permitting the human operator to approve or edit the shortlist of control profiles.

11. The computer-implemented method for controlling an engine system according to claim 1, further comprising:
recording control data while controlling the vehicle engine system with the controller in accordance with the selected control profile;
assessing the control data to determine whether the selected control profile provides the required control characteristics for the relevant operating condition and one or more contextual conditions; and
if the required control characteristics are not provided:
determining an alternative control profile for the relevant operating condition and one or more contextual conditions or
determining alterations to the selected control profile to provide the required control characteristics.

12. The computer-implemented method for controlling an engine system according to claim 1, wherein the control is of the engine propulsion system.

13. An engine control system for a vehicle comprising:
a controller configured to control an engine system of a vehicle, wherein the controller is configured to:
determine an operating condition of the vehicle and determine one or more contextual conditions relevant to the vehicle;
receive mission prediction information comprising an expected operating conditions of the vehicle during an upcoming mission and a plurality of expected contextual conditions during the upcoming mission;
automatically access a library of control profiles an create a shortlist of control profiles from the library based upon the expected operating conditions and the expected contextual conditions; and
populating a directory of control profiles with the shortlisted plurality of control profiles;
select, based upon the determined operating condition and one or more contextual conditions, a control profile from the directory;
apply the selected control profile; and
control the engine system in accordance with the selected control profile.

14. The engine control system according to claim 13, the engine control system configured to implement a computer-implemented method for controlling the engine system of the vehicle comprising:
determining an operating condition of the vehicle;
determining one or more contextual conditions relevant to the vehicle;
selecting, based upon both the determined operating condition and the determined one or more contextual conditions, a control profile for the engine system from a directory comprising a plurality of control profiles having different control characteristics;
applying the selected control profile to a controller of the engine system;
and controlling the engine system with the controller in accordance with the selected control profile.

15. The engine control system according to claim 13, wherein the vehicle is an aircraft, and wherein the engine system is an aircraft engine system.

16. A gas turbine engine for an aircraft, the gas turbine engine comprising the aircraft engine control system of claim 15.

17. The gas turbine engine of claim 16, further comprising:
an engine core comprising a turbine, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft.

18. The gas turbine engine according to claim 17, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

19. An aircraft comprising a gas turbine engine according to claim 16.

20. A computer-implemented method for controlling an engine system of a
vehicle comprising:
determining an operating condition of the vehicle;
determining one or more contextual conditions relevant to the vehicle;
selecting, based upon both the determined operating condition and the determined one or more contextual conditions, a control profile for the engine system from a directory comprising a plurality of control profiles having different control characteristics;
applying the selected control profile to a controller of the engine system;
controlling the engine system with the controller in accordance with the selected control profile;
recording control data while controlling the vehicle engine system with the controller in accordance with the selected control profile;
assessing the control data to determine whether the selected control profile provides the required control characteristics for the relevant operating condition and one or more contextual conditions; and
if the required control characteristics are not provided:
determining an alternative control profile for the relevant operating condition and one or more contextual conditions; or
determining alterations to the selected control profile to provide the required control characteristics.

* * * * *